Dec. 20, 1949     H. H. RAUH     2,492,064

FISHING BAIT

Filed May 16, 1946

INVENTOR.

Herbert H. Rauh

BY

Wood, Avery, Herron & Evans

ATTORNEYS

Patented Dec. 20, 1949

2,492,064

UNITED STATES PATENT OFFICE 2,492,064

FISHING BAIT

Herbert H. Rauh, Columbus, Ohio

Application May 16, 1946, Serial No. 670,190

5 Claims. (Cl. 43—42.28)

This invention relates to artificial baits or lures of the type used for catching fish. More particularly, the improvements herein set forth relate to that type of bait conventionally referred to as a spoon for the reason that the structure of the body resembles the body portion of a teaspoon. In the past, baits have been designed which were of this form and which have utilized various means for concealing the hook and for attracting the fish. Also efforts have been made to simulate all the different types of marine life upon which fish are known to feed.

It has been the object of the present inventor to provide a lure or bait which, although artificial, will more than ever simulate marine life and thus will be more attractive to the fish. In the accomplishment of this object the inventor has combined a spoon structure of improved form, with a flexible sheet which has a novel arrangement of extensions and is attached and related to the spoon in a novel manner.

More particularly, it has been the object to provide a lure of this type in which flexible or trailing extensions loosely stream out or dangle from the spoon and are sufficiently free in action to present a wiggly mass of feelers or legs, the appearance of which has been found to be most attractive to game fish.

Further objects of the inventor relate to the manner of attaching and correlating the parts as well as the structure of the spoon itself wherein its action in the water is more efficient, that is, whereby it will not tend to revolve but will keep on an even keel while taking a sinuous path through water.

Figure 1:
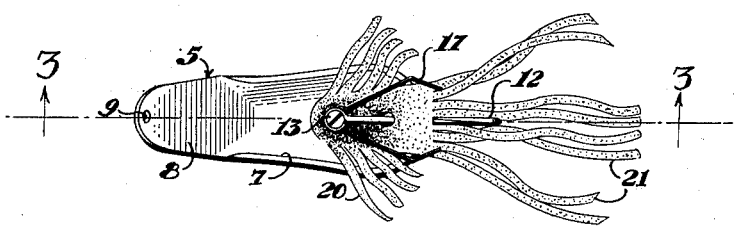
Figure 1 is the top plan view illustrating the improved artificial bait.
Figure 2:
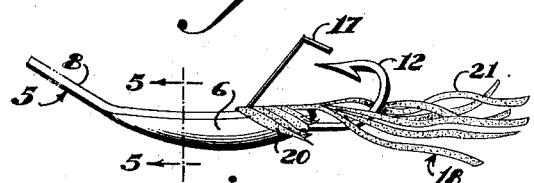
Figure 2 is the side view further illustrating the bait.
Figure 3:
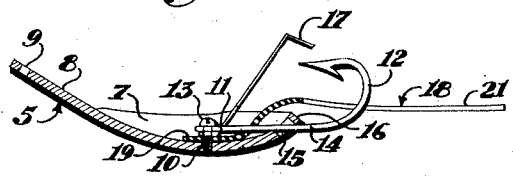
Figure 3 is the sectional view taken on line 3—3, Figure 1, illustrating the attachment of the flexible element to the spoon element.

Referring to the drawings, the spoon element is indicated at 5. This element which constitutes the body of the bait is formed of plate stock and comprises a spoonlike portion 6 which is arcuate both transversely and longitudinally. This body element is not truly semi-circular but rather the side-wall portions 7 turn upwardly and are substantially at right angles to the central portion of the bottom of the spoon.

The body further includes a flat, forwardly, upwardly-extended portion 8. This portion is a continuation of the longitudinal curvature of the body and is tangential thereto. The flat portion includes an aperture 9 through which the line or towing means is attached. By virtue of the curvature, above described, the body element of the bait will tend to ride on top of the water if retrieved rapidly. The fisherman can keep the lure at any desired depth by varying slightly the pull thereon as the bait is drawn through the water. The substantially vertically-disposed sides aid greatly in maintaining the bait on an even keel by preventing it from turning or rotating in the water. Further, the bait will tend to have a swinging or sinuous motion which will aid greatly in its attractiveness to the fish as will be apparent from the further description.

Centrally, at the bottom of the spoon a screw-threaded aperture 10 is provided. The eyelet end 11 of the hook 12 is attached to the plate by means of a screw 13, passed through the eyelet, and screw-threaded into the aperture. The shank 14 of the hook passes through an aperture 15 in the upwardly-turned rear end 16 of the spoon. Normally while in use, this shank portion lies in a horizontal plane, the hook projecting from the rear of the spoon. A conventional weed-guard element 17 is secured beneath the eyelet and has its projections disposed in the usual manner with respect to the hook proper.

Figure 4:
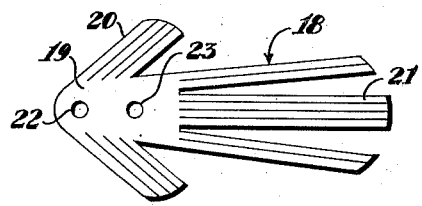
Figure 4 is the plan view showing the cut blank from which the flexible element is manufactured, this view illustrating the strips of the flexible element at the time of cutting.
Figure 5:
Figure 5 is the sectional view taken on line 5—5, Figure 2, illustrating the tranverse section of the bait.

As stated, a rubber skirt or a skirt made of some flexible material is associated with the spoon in order to provide an appearance attractive to the fish. As illustrated in Figure 4, this element is cut from sheet stock and is generally indicated at 18. It includes a body portion 19, lateral strip portions 20, and rearwardly-extended strip portions 21. When cut from stock, the plurality of strips 20 which are angular laterally lie in parallelism. The rearward strips 21 are in groups, there being two slightly laterally-disposed ones at each side and four central ones.

The illustration of Figure 4 shows the distribution of the strips when the stock is flat, i. e., at the time of cutting. However, when placed on the spoon and left without support other than that for the central portion 19, the strips become extremely flexible and wiggly. The arrangement of strips depicted is not designed to represent any particular form of marine life but, in general, the trailing strips or streamers simulate the appearance of legs and present different appearances, depending upon the speed with which they are drawn through the water. Any movement of the bait through the water will cause waving or wiggling of the strips and will impart a lifelike or animated appearance.

This sheet of flexible material thus prepared is attached to the spoon in the following manner: The forepart of the body portion includes an aperture 22. The screw 13 passes through this aperture and thus the body 19 is secured beneath the eyelet upon the central portion of the spoon. Immediately to the rear of this aperture is another aperture 23. The shank of the hook passes through the last-named aperture. Thus, all of the sinuous or wiggly strips dangle over the edge of the spoon and stream out laterally and rearwardly to produce the effect heretofore described. The hook is disposed within the group of rearward strips 21.

As stated, no attempt is made to produce the appearance of any particular marine life but rather the effect is that of a multiplicity of legs or feelers around the rear portion of the spoon.

Having described my invention, I claim:

1. A fishing lure comprising, a body incorporating a spoon portion having a central portion and a flat upwardly-inclined forward portion, said spoon portion including sides which are substantially at right angles to the central portion of the spoon, a hook secured to the central portion of the spoon, the hook having a shank projecting rearwardly from the spoon through an aperture therein, and a sheet of flexible material having a body portion secured on the top surface of the spoon said body portion being clamped between the shank of the hook and the top surface of the spoon and having an intermediate portion through which the shank of the hook extends and a rearward portion disposed above the shank of the hook, the rearward portion including a multiplicity of extensions disposed laterally and rearwardly from the spoon, said extensions being extremely flimsy so that they tend to stream out and wiggle as the bait is moved through the water.

2. A fishing lure comprising, a spoon, a hook including a shank secured at two spaced points to the spoon and projecting rearwardly therefrom, and a sheet of flexible material having a body portion disposed in clamped engagement between the shank of the hook and the top surface of the spoon and including a multiplicity of extensions disposed laterally and rearwardly from the spoon, said extensions being extremely flimsy so that they tend to stream out and wiggle as the bait is moved through the water.

3. A fishing lure comprising, a body incorporating a spoon portion and a flat upwardly-inclined forward portion, a hook secured to the central portion of the spoon and projecting rearwardly through an aperture in the spoon portion, and a sheet of extremely flexible material having a body portion disposed in clamped engagement between the hook and the top surface of the spoon and including a multiplicity of thin extensions disposed laterally and rearwardly from the spoon, said extensions being extremely flimsy so that they tend to stream out as the bait is moved through the water.

4. A fishing lure comprising, a spoon, a skirt formed of thin pliable sheet material slitted to provide a body portion and a plurality of rearwardly extending strips, a hook element constituting a shank having an eye at one end and a hook at the opposite end, said shank overlying the body portion of the skirt with a rearward portion of the shank passing through said body portion and through an aperture formed in the spoon to anchor the shank to the spoon, a screw passing through the eye of the hook and into threaded engagement with the spoon to draw the shank into clamping engagement with the body portion of the skirt, the body portion being clamped between the spoon and shank and with the hook extending rearwardly from the spoon and concealed by said rearwardly extending strips.

5. A fishing lure comprising, a concave spoon, a skirt formed of flat pliable sheet material slitted to provide a body portion and a plurality of rearwardly and laterally extending strips, a hook element constituting a shank having an eye at one end and a hook at the opposite end, said shank overlying the body portion of the skirt with a rearward portion of the shank passing through said body portion and through an aperture formed in the spoon to anchor the shank to the spoon, a screw passing through the eye of the hook and into threaded engagement with the spoon to draw the shank into clamping engagement with the body portion of the skirt, the clamping portion of said shank being located substantially in the center of the concave spoon to nest the body portion of the skirt into the spoon with said rearwardly and laterally extending strips dangling over the edge of the spoon.

HERBERT H. RAUH.

REFERENCES CITED

The following references are of record in the file of this patent:

UNITED STATES PATENTS

| Number | Name | Date |
|---|---|---|
| 1,265,900 | Foss | May 14, 1918 |
| 1,849,905 | Braidwood | Mar. 15, 1932 |
| 1,851,529 | Stapf | Mar. 29, 1932 |
| 1,896,132 | Berberich | Feb. 7, 1933 |
| 1,976,695 | Boehm | Oct. 9, 1934 |
| 1,992,766 | Pflueger | Feb. 26, 1935 |